Jno. Reily,
Mower.

No. 15,252.   Patented Jul. 1, 1856.

UNITED STATES PATENT OFFICE.

JOHN REILY, OF HEART PRAIRIE, WISCONSIN.

IMPROVEMENT IN REAPING AND MOWING MACHINES.

Specification forming part of Letters Patent No. 15,252, dated July 1, 1856.

*To all whom it may concern:*

Be it known that I, JOHN REILY, of Heart Prairie, in the county of Walworth and State of Wisconsin, have invented a new and useful Improvement in Reaping and Mowing Machines, of which the following is a full, clear, and exact description, reference being had to the accompanying drawings of the same, in which—

Figure 2:
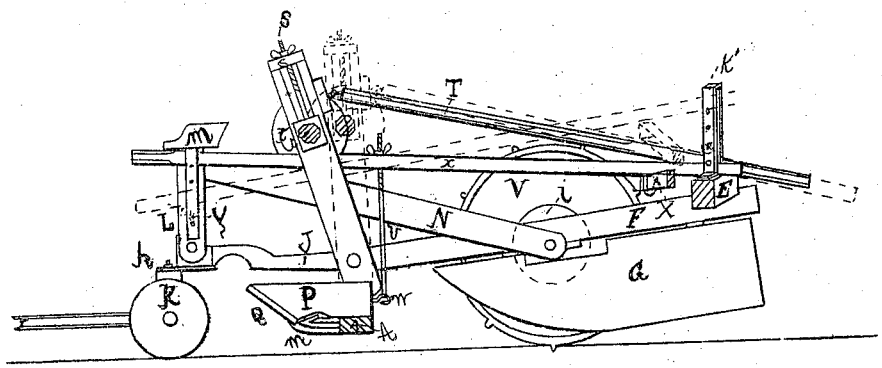
Figure 3:
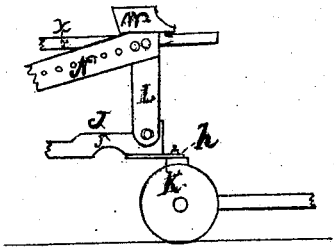
Figure 1:
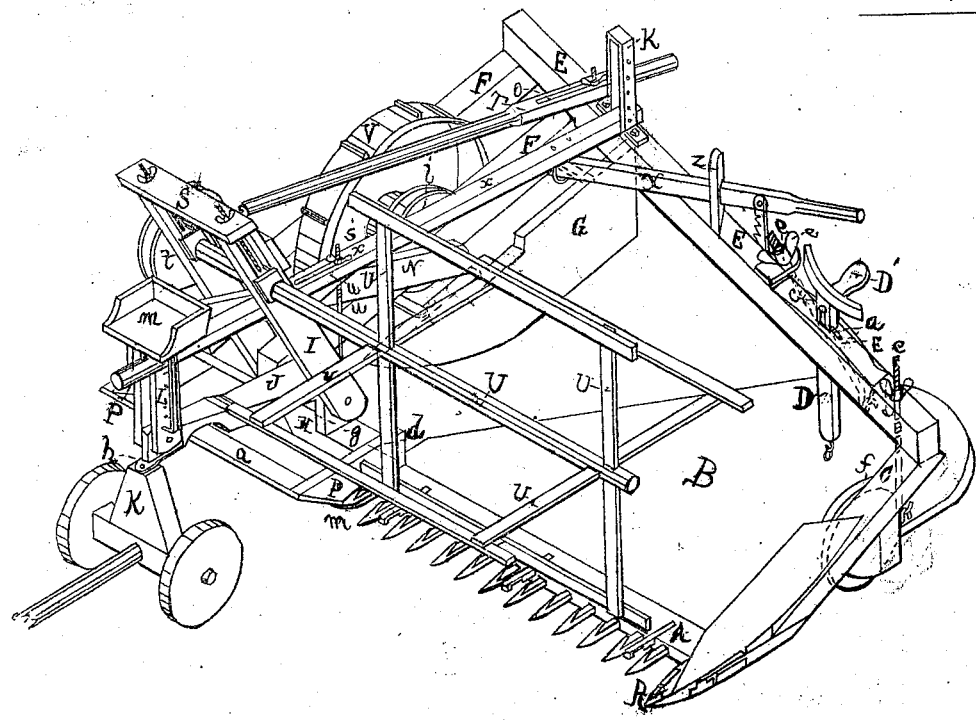

Figure 1 represents a view in perspective of a machine embracing my improvements; and Fig. 2, a section of the same, taken through the finger-bar and cross-beam on the side next the driving-gear, the reel-posts and lever being in the same position shown in Fig. 1, the dotted lines showing the reel-posts in a vertical position and the cutter-bar raised by the lever from the rear of the machine. Fig. 3 represents a side elevation of the driver's seat and part of the lever, brace, and drag-tongue, which are shown as broken off.

My invention relates, first, to a new mode of raising and lowering the finger-bar from either the driver's or raker's seat, or from both at the same time, in order to enable it to override such obstructions as may come in its way, as also to adjust the cutters to any required height. Heretofore these adjustments have been effected from the driver's seat; but as it frequently happens that his whole attention requires to be devoted to the guidance and management of the horses, it therefore becomes necessary that the machine should be so constructed as to be capable of being conveniently raised from the raker's stand or rear of the machine, as well as from the driver's seat, the advantages of which are self-evident, as many accidents will be prevented that would otherwise occur if placed in the power of one man alone to attend to. Another advantage arising from raising the cutters from the rear is the fact that the raker can raise it with more ease than the driver, inasmuch as he operates upon the long arm of the lever—a point of considerable importance in many instances, as he is enabled to lower it with more expedition than the driver when the machine comes to patches of laid grain (which are scattered through almost every field) and raise it again when passed. Many other reasons might be adduced, but these are deemed sufficient to attest to its practical value.

The second branch of my invention relates to a device to prevent the driver's seat from being pitched forward as the cutter-bar is raised and backward when lowered, both having a tendency to throw him from his seat, to the great danger of his life.

My improvement consists in hinging the lower end of the standards that support the seat to the drag-tongue, so that as the cutter-bar is raised the rear end of the tongue is carried up with it, turning on the joint formed on its forward end with the standards of the seat, the upper ends of the standard being stayed by a brace hung on the axis of motion of the machine.

To enable others skilled in the art to make, construct, and use my improvements, I will now proceed to describe them particularly, omitting such details of the general construction of the machine as are unessential to the full understanding of the same.

A represents the finger-bar, to the rear of which is hinged the front end of the swinging platform B next the driving-gear, the other end being pivoted to the side beam of the frame C next the standing grain, the rear end of the platform being hinged to and supported by the standard D of the raker's seat, the standard of the latter being passed through a mortise in the cross-beam E, that connects the side frame, C, to main frame F, the rear end of the platform being adjusted at any required angle to the finger-bar by means of a bolt, *a*, passing through a hole (of which there are a series) in the standard D, and resting on the cross-beam E, upon which the platform is suspended. To prevent any tendency of the platform at this end to rock, adjustable bolts *c* may be hinged on either side of the raker's stand, or on one only, and passed through the cross-beam E, to the upper side of which they are secured by wing-screws *e*, they being free to slide, like the raker's seat, in an upward direction when moved by the platform as it overrides obstruction, and in a downward direction until arrested by the wing-nuts *e*. The object of their adjustability is for the purpose of enabling the angle of the platform to be varied as may be required.

The platform B on the side next the driving-gear is set at an angle to the cutter-bar A, as shown in dotted lines at *d*, the object of which is to enable the raker to deposit the grain evenly and almost simultaneously upon the ground, thus preventing straggling, &c., the platform slipping from under the butts as the machine advances, the angle compensating for the increased distance that the grain from the farther side of the pivoted point has to advance.

On the upper side of the platform B, next the standing grain, is secured a shield-plate, f, to guard and protect the wheel that supports that side of the machine from becoming entangled with the falling grain. The upper side of this plate must be made of a sufficient height from the platform to allow the wheel to run freely when the latter is set at its lowest angle. On the under side of the front end of the main frame F is secured a beam, H, forming a continuation of the cutter-bar A, on the upper side and inner end of which is erected a short standard, g, to which and the end of the inner rail of the main frame F is hinged or jointed the reel-posts I and drag-tongue J, the forward end of the latter resting upon a bed-plate, h, secured on the truck K by means of a king-bolt. On this end of the drag-tongue are jointed the standards L, that support the driver's seat M, the seat being supported and held in an upright position by means of a brace, N, secured at one end to one of the standards, the other end being mounted upon a pivot, i, at the center of the axis of motion of the machine; or it may be mounted upon the journal of the driving-wheel V, upon the axis of which the whole machine turns as the cutter-bar is raised and lowered. The object of hinging the standards of the raker's seat is to keep it in an upright position and to prevent vibration, as the drag-tongue would, if not hinged to them, press it forward, causing it to describe the arc of a circle when the cutter-bar is raised and backward when lowered, the pivoting of the end of the brace at the axis of motion allowing it to compensate for the motion of the machine, the distance of the seat to this axis being under all circumstances the same, no matter what the motions of the latter may be. If the driver desires to incline the seat slightly backward, all that is necessary for him to do is to withdraw the bolt from the brace and secure it to the seat again through a hole pierced nearer its pivoted end, there being several for this purpose. Instead of hinging the standards to the drag-tongue, they may be rigidly secured to the truck and the drag-tongue hinged to the latter, these standards being then supported in the same manner as those hinged to the drag-tongue by means of the brace N.

At the end of the cutter-bar A, next the main frame F, are secured two arms, P P, projecting forward and connected at their outer extremity by a guard-board, Q, set at an acute angle to the surface of the ground, forming a shield-board to protect the driving-gear of the cutting apparatus from dirt, and also to guard them from injury from stumps or other obstructions, as its tendency is to raise the front of the machine as it overrides them, the inner one, P, serving also as a finger to turn the outer grain in toward the knife. On the under side of this arm is secured a shoe, m, another being fixed on the under side of the divider R on the side next the standing grain.

On the upper ends of reel-posts I is secured a cross-beam, S, connecting them rigidly together. To this beam is hinged a lever, T, by means of a hook and eyebolt, the lever extending back over the frame and resting upon the cross-beam E, to which it is secure by a bolt passing through a slot, O, into the cross-beam. The object of attaching this lever to the posts I in this manner is for the purpose of throwing them backward or forward in a parallel line, according to the position it is desired to operate the reel U, the real posts being held in any required position by means of the thumb-screw s, which secures the lever T to the cross-beam E, motion being communicated to the reel U by a band passing round the pulley t from the pulley t', mounted on the shaft of the driving-wheel V, the reel itself being capable of being raised and lowered by means of screws.

On the rear side of the end of the cutter-bar, attached to the main-frame F, is secured an eyebolt, w, to which is connected a rod, u, passing through a mortise, u', in the raising-lever x, on the upper end of which is cut a screw-thread, through which it is secured to the lever by means of a wing-nut, one end of the lever projecting toward the driver's seat and resting upon a bracket secured to the inside standard of the latter, the side of the bracket forming a guide in which it is free to move up or down. Through the side of the bracket and standard are pierced a series of holes for the reception of a pin, which acts as a fulcrum when the cutter-bar is raised from the rear end of the lever, and acts as a rest for the lever when raised from the front end, the cutters being held in a high or low position, according to the hole through which the bolt is passed. The other end of the lever is supported upon the cross-beam F, between the two arms of the staple K', secured on the latter end, which serves as guide to it in the same maner as the forward end. Through these arms may be placed a series of holes for the reception of a pin upon which this end of the lever may rest to hold the cutter at any required height, or to act as a fulcrum when raised by the forward end; but as such an arrangement as this would be fraught with difficulties, as it involves the necessity of the raker descending from the platform to raise the cutter-bar, or else a separate attendant for that purpose, I attach a supplementary lever, X, for this purpose, which has its fulcrum mounted in standards Z, erected on the cross-beam E, and its handle within convenient distance of the raker, so that he can raise it without descending from the platform, thus enabling him to raise and lower the cutter-bar independent of the driver; and, as it may be necessary for him to keep it in a certain position for a length of time, a ratchet-link, r, is suspended from said lever, by which it is secured to a stud in the rear of the cress-beam between him and the fulcrum, holding the cutters at any required height. When it is desired to raise the cutter-bar with a less motion of the lever the length of the rod between the latter and the former is shortened by means of the wing-nut $s'$, and vice versa.

Having thus described my invention, what I claim as new, and desire to secure by Letters Patent, is—

1. The method of raising and lowering the cutter-bar, either from the driver's or raker's seat, or from both simultaneously, by means of the rod $u$ and lever $x$, in combination with the lever X, substantially as described.

2. Hinging the driver's seat to the drag-tongue, when combined with a brace pivoted to the axis of motion of the machine, substantially in the manner and for the purposes described.

In testimony whereof I hereunto set my hand.

JOHN REILY.

Attest:
P. HANNAY,
I. PERCIVAL SMITH.